United States Patent Office 3,437,804
Patented Apr. 8, 1969

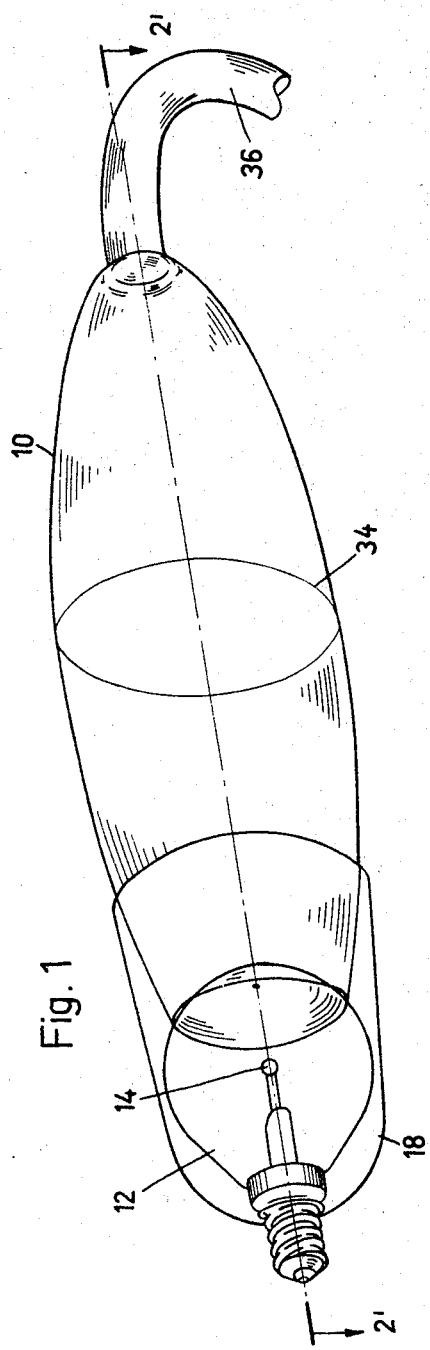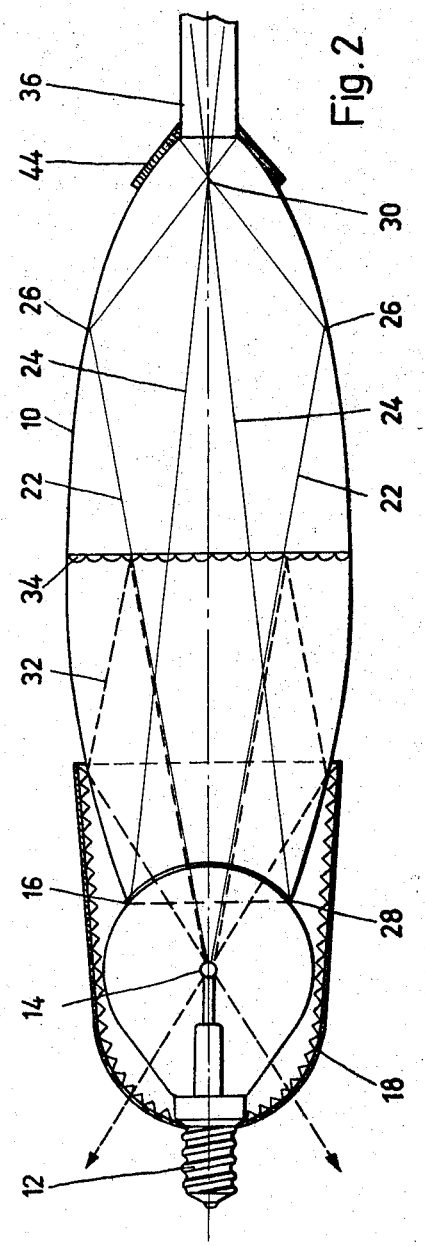
Inventor:
VOLKER SCHAEFER
JUERGEN F. SCHAEFER

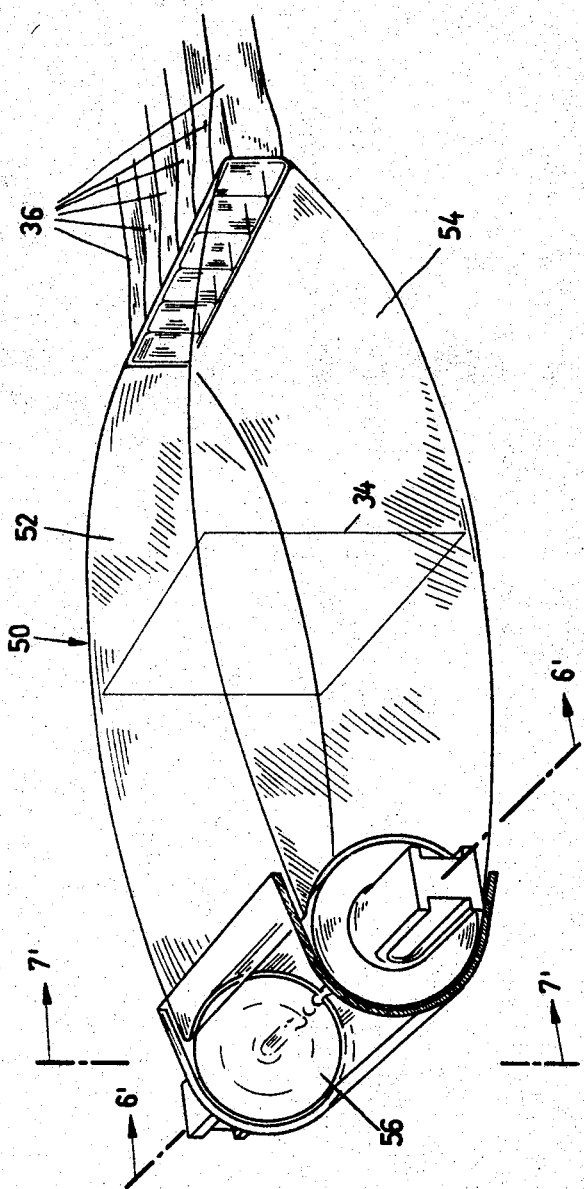

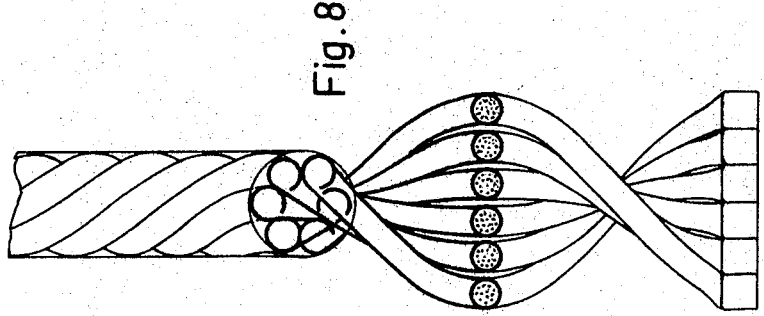
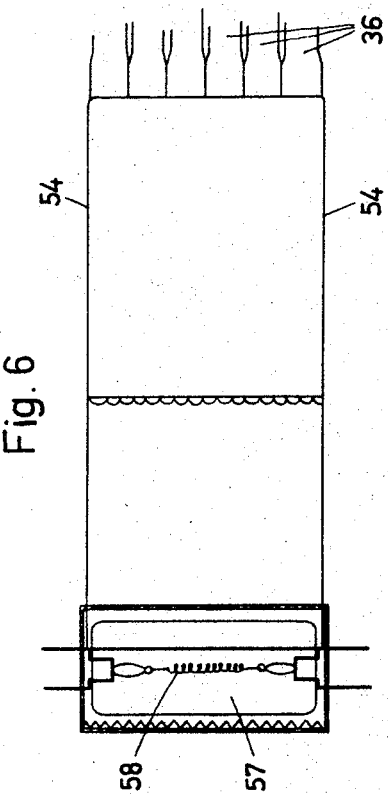
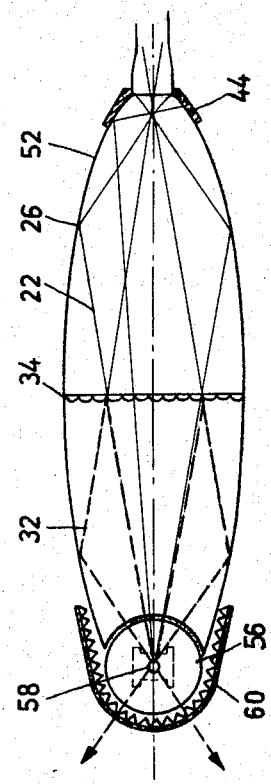

3,437,804
LIGHT TRANSMITTING DEVICE
Volker Schaefer, Bruchkobel, and Juergen Schaefer, Niedermittlau, Kreis Gelnhausen, Germany, assignors to Quarzlampen Gesellschaft mbH, Hanau am Main, Germany
Filed Apr. 5, 1965, Ser. No. 445,527
Claims priority, application Germany, Apr. 11, 1964, Q 784
Int. Cl. F21v 7/20
U.S. Cl. 240—41.35          8 Claims

ABSTRACT OF THE DISCLOSURE

A light source is placed at one focus of an elliptical reflecting surface and a light transmitting fiber bundle is placed adjacent the other focus of the surface. A heat-blocking reflector is placed between the two foci and a heat radiation transparent reflector is placed behind the one focus. The reflecting surface can be the internal surface of a hollow body or it can be the surface of a transparent solid. The surface can be that of an ellipsoid of revolution or of a cylindrical ellipsoid. The fiber bundle is located such that all entering light rays are totally reflected within the bundle.

Background of the invention

The present invention relates to a light transmitting device for the transmission of the total luminous flux of a light source into one or several glass fiber bundles.

Summary of the invention

The primary object of the invention is to introduce only the visible range of the total luminous flux of a light source into a glass fiber bundle to produce "cold light" which alone will emerge from the glass fiber bundle free of heat. This is desirable for various purposes, such as the medical technique, in instances where it is required that areas to be treated by the physician are illuminated in a non-glaring and shadow-free manner, while eliminating heat.

Another object of the present invention is to provide a light source, disposed in a focal point of an elliptical reflecting body of high eccentricity, having the inlet of the glass fiber bundle positioned beyond the second focal point. Eccentricity is the ratio of the distance between the foci to the maximum radial dimension of an ellipse.

Still another object of the invention is to provide only one optical system, whereby the image of the light source is transmitted to an operating area by way of a light guide.

Yet another object of the invention is to provide a pin-point light source, advantageously arranged in the focal point of an ellipsoid of revolution with a single glass fiber bundle positioned adjacently beyond the second focal point.

A further object of the invention is to provide an elliptical reflecting cylinder, having an elongated light source disposed in the focal line of the elliptical cylinder with several glass fiber bundles distributed over the length of the focal line, adjacently beyond the second focal line.

Yet another object of the invention is to employ either a totally reflecting solid body or a hollow body coated with a reflecting layer or mirror inside or outside. In either case, the light source rests partially against the reflecting body and is partially surrounded by a reflecting layer so that the total luminous flux can be introduced into the reflecting body. By virtue of the fact that, in accordance with the present invention, the reflecting layer is permeable to heat rays, the heat is filtered out of the radiation which is introduced into the reflecting body, by way of the reflecting layer. For the thermal radiation which penetrates into the reflecting body, a heat-blocking layer is provided in the reflecting body and arranged within the region of greatest extension thereof so as to keep the thermal stress of the reflecting body as low as possible. The heat-blocking layer may be either a heat filter or a heat-reflecting mirror.

The distance of the fiber bundle being provided adjacent the reflecting body, or the distance of the adjacent fiber bundles, is so chosen that the second focal point and, respectively, the second focal line of the reflecting body is positioned in the apex of the angle within which all the radiation in the fiber bundle is transmitted or propagated by total reflection. In this manner, an optimum transfer or transition of rays from the reflecting body into the adjoining fiber bundle or bundles is assured. This angle does not initially include (or reach) the radiation which in the reflecting body, after the passage through the second focal point or the second focal line does not impinge upon an opening of glass fiber bundles, but upon the outer wall of the reflecting body. In the case where the reflecting body is a totally reflecting solid body, the condition of total reflection no longer exists for this radiation; for this reason, the present invention proposes that the area of the outer wall between the second focal point and the opening of the glass fiber bundle be coated with a mirror-like reflecting layer.

Further features, advantages and possibilities of the application of the present invention will become apparent from the following description of the attached drawings wherein like references represent the same or equivalent parts.

Brief description of the drawing

FIG. 1 is an isometric view of an embodiment of the present invention employing an axially symmetrical reflecting body;

FIG. 2 is a cross-sectional view of FIG. 1, taken along the sectional plan 2'—2' thereof;

FIG. 5 is an isometric view of a further embodiment of the invention comprising an elliptical reflecting body suitable for connection with several fiber hose;

FIG. 6 is a cross-sectional view taken along the sectional plane 6'—6' of FIG. 5;

FIG. 7 is a cross-sectional view taken along the sectional plane 7'—7' of FIG. 5 and FIG. 8 shows the transition of the fiber bundles into a hose.

Description of the preferred embodiments

Figure 3:
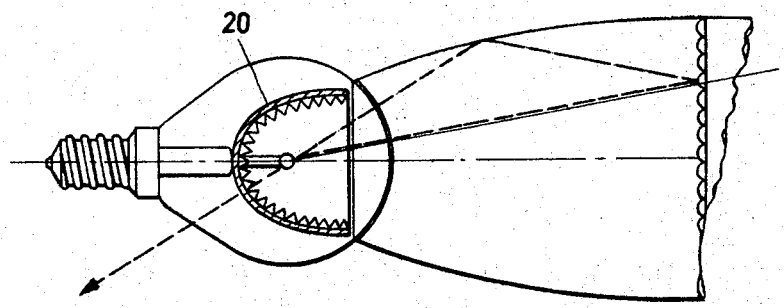
FIG. 3 shows in cross-section a modified structure of the light source used in the embodiment of FIGS. 1 and 2.

Referring in detail to the disclosure and particularly to the drawings wherein like reference numerals denote the same or similar structures throughout the several views, in the embodiment illustrated in FIGURES 1 to 3, the reflecting body is shaped as an elongated ellipsoid of revolution 10. If the reflecting body is hollow, its outer wall is coated with a reflecting layer; if the body is solid, the total reflecting capacity of the material must be usable, for which reason a body made from organic synthetic glass is very well suited for this purpose. At one end of the ellipsoid of revolution 10 is an almost pin-point shaped source of rays. A light bulb 12 rests against the reflecting body in such a manner that an incandescent helix 14 or filament is disposed in a first focal point of the ellipsoid. For this purpose, the outer wall of the light bulb rests against the ellipsoid in a correspondingly formed recess 16 thereof. The light radiation given off into the solid angle—insofar as it is not directed immediately into the ellipsoid—is reflected by a reflector 18. The reflector 18 is built as a so-called cold light mirror.

FIGURE 3 illustrates an embodiment in which a reflector 20 provided as a cold light mirror is disposed within the bulb.

Two rays 22 and 24 are shown selected from among the light rays emitted by the light bulb 12. The light ray 22 passes from the incandescent helix 14 directly over into the ellipsoid and is reflected at a point 26 on the inner wall of the ellipsoid in such a manner that it passes through a second focal point 30. In a similar manner, the light ray 24 simultaneously reflected at a point 28 will also pass through the focal point 30. All rays emitted by the light source are collected in the second focal point 30 either in this manner or by means of reflectors.

The radiation which does not enter directly into the ellipsoid and which lies within the visible range of the light, is reflected into the ellipsoid by a suitable reflector 18. The reflector is built in such a manner that the infrared radiation may largely penetrate through the reflecting layer. In the embodiment of FIGURE 3, this condition is equally met by means of the reflecting layer 20.

The heat rays which still arrive directly in the ellipsoid, such as, for example, rays 32, are prevented from getting into the second focal point 30 by a blocking layer 34. The blocking layer 34 may be either a heat filter or a heat-reflecting mirror which is permeable to the visible light.

The blocking layer 34 is preferably arranged within the zone or area of greatest extension of the reflecting body in order to assure that the thermal stress of the blocking layer remains non-critical.

A "cold light mirror" is a mirror which reflects the radiation in the visible range and transmits the radiation in the infrared range. Thus only the so-called cold light (without heat rays) is reflected. It is represented also as reflector 18. FIGURE 2 shows this selective reflection (visible range reflected, heat range transmitted) by the zig-zag lines. The heat-reflecting mirror 34, contrary to the cold light mirror, differentiates according to the type of radiation. The mirror constituting the blocking layer 34 is permeable to the visible spectrum and reflects the heat rays. Both types of mirrors are well known in the art; there are various methods of presenting the different effects of these mirrors. One widely used method is the so-called interference mirror.

The cold light mirror is known to the prior art as cold light mirror and described in U.S. Patents 3,099,403 and 2,660,925, and a publication in the International Projectionist, April 1961, pages 6, 7, 8, 9 and 19, and elsewhere.

When the ellipsoid of revolution 10 is a solid body, the blocking layer 34 is applied onto the intersecting surfaces of the solid body. If the body 10 is hollow, the mirror is clamped between the outer wall and mounted in any suitable manner.

The plane of the end of the fiber bundle must by no means go through the focal point of the elliptical body. The best result is obtained if the distance between the focal point and the plane of the fiber bundle is so chosen that the point of origin of the aperture angle of the fiber bundle lies precisely in the focal point. A fiber bundle has an aperture angle and when within this aperture angle light falls on the front surface of the fiber bundle, the light within the bundle is conducted by total reflection. If the light falls on the front surface at a large angle, it breaks through the side wall of the bundle, thus gets lost and cannot be transmitted in the bundle.

The fiber bundle 36 is mounted at the hollow ellipsoid with any desired auxiliary construction. As a general rule, a fiber bundle is encased by a tube, e.g. a metal tube. This tube may be extended over the front end surface of the fiber bundle and be fixed to the outer skin of the elliptical body, so as to permit determination of the angular position of the front surface of the elliptical body.

Figure 4:
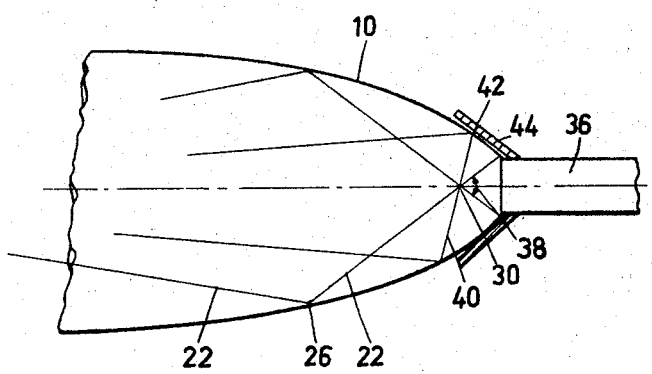
FIG. 4 is a schematic transverse sectional view of the invention which illustrates in further detail the path of rays at the second focal point.

FIGURE 4 illustrates in detail the connection of a glass fiber hose 36 to the reflecting body. The glass fiber hose 36 is connected to the reflecting body at such a distance from the focal point 30 that its cross section appears, when viewed from the focal point, under a specific angle 38 which corresponds to the specific opening angle of the fiber hose. The specific opening angle of a glass fiber bundle defines the angular range within which all the entering radiation within the fiber bundle is propagated by total reflection. When maintaining the distance which corresponds to the opening angle, an optimum transmission of light from the reflecting body into the glass fiber hose 36 is attained. The light ray 22 indicated in FIGURE 4 impinges upon the fiber hose 36 under the angle 38. If the end of the fiber hose 36 were moved more closely to the focal point 30, the cross section of the fiber hose 36 could not be fully utilized. If the distance were larger than that defined hereinbefore, the optimum opening angle of the fiber hose 36 would not be utilized. As already mentioned, elliptical reflecting bodies of high eccentricity are desired. This is because more of the light enters the fiber hose within the angle of total reflection. It is of course evident that engineering factors limit the size of the eccentricity and that it must only be maximized.

After passing through the focal point 30, the ray 22 drawn in FIGURE 4 impinges in the angle 38 just upon the edge of the glass fiber hose cross section. A further light ray 40 lies outside of the opening angle 38 and—no longer under the condition of total reflection—will therefore impinge at a spot 42 upon a surface 44 coated with a mirror-like reflecting layer and from there it will be reflected back into the first focal point 14. From there, this light ray passes once again through the reflecting body, and after the renewed passage through the second focal point 30 will then be within the opening angle 38 and therefore will be passed into the glass fiber hose 36. The coating with a mirror-like reflecting layer 44 is necessary for a small area between the focal point 30 and the glass fiber hose 36 since the radiation impinging thereat can no longer be totally reflected, as shown in the example of ray 40.

FIGURE 5 illustrates a modified embodiment which is particularly suitable for the use of an elongated light source. The luminous flux which is given off by this light source may preferably be transmitted into several fiber hose tubes 36. In this present instance, the reflecting body is provided as an elliptical cylinder which has a rotary elliptically curved surface 52 and two flat sides 54. The reflecting body may be a hollow structure which is coated with a reflecting layer at the inside thereof. According to a further embodiment, it may also be a totally reflecting solid body. The light source is an elongated bulb 56 which may be a quartz iodine lamp of a high output. The elongated light bulb 56 is positioned in a recess within the reflecting body in such a manner that the filament is disposed in the focal line of the elliptical cylinder. When the elliptical cylinder is provided as a hollow body, the light bulb 56 is completely surrounded by reflecting layers. When the reflecting body is provided as a solid body, the layer which rearwardly surrounds the light bulb 56 is provided with a mirror. The mirror is preferably provided as mirror 60, permeable to infrared light. When the reflecting body is provided as a hollow body, the entire reflecting layer of the body is provided as cold light mirror.

A blocking layer 34 is disposed within the zone or region of the greatest extension in the manner described above in order to either filter out or reflect the infrared radiation.

According to the cross-sectional view of FIGURE 7, the path of rays in the cylindrical ellipsoid corresponds to the illustration given hereinbefore on the basis of FIGURE 2 for the conditions in the ellipsoid of revolution. For this reason, FIGURE 7 employs for indicating the path of rays the reference numerals, which already have been previously described and defined. The courses of the rays described in connection with FIGURE 4 are valid also for the conditions during the transition from the cylindrical ellipsoid into the several fiber hose 36 now present. FIGURE 4 represents thereby merely one plane from among many like planes possible.

The multiple connected fiber hose may be guided to separate light outlets. In accordance with FIGURE 8, it is also possible, however, to combine the fiber hose 36 arranged in juxtaposition to one uniform light conductor hose.

The above disclosure describes only a prefered example of the invention. It is, however, intended to cover also all changes and modifications of the embodiments shown, which do not depart from the scope and spirit of the invention as claimed.

We claim:
1. An illuminating-light transmitting device comprising a body having an elliptical reflecting surface of maximized eccentricity, a point light source mounted at one focus of said surface, and a light transmitting fiber bundle secured to said body adjacent the other focus of said surface with its end surface disposed perpendicular to the major axis of said elliptical surface at a distance from the other focus of said elliptical surface such that all singly reflected rays of light which reach said end surface after only one reflection from said reflecting surface impinge on said end surface within the specific opening angle of total reflection, those singly reflected rays impinging on the outer edge of said end surface doing so at the specific angle, and further comprising as a separate component a light reflector mounted around the light source on the side of said one focus opposite to said other focus and overlapping said one focus, said reflector being transparent to heat radiation in order to provide cooling, said elliptical reflecting surface being absent at the location of said reflector.

2. A device as claimed in claim 1 wherein said body is an ellipsoid.

3. A device as claimed in claim 1, said body being a solid of light transmitting material.

4. A device as claimed in claim 3, further comprising a mirror-like reflecting coating (44) on the outer wall of the solid between said other focus and said end surface of the fiber bundle.

5. A device as claimed in claim 4, further comprising a light reflector mounted around the light source on the side of said one focus opposite to said other focus, said elliptical reflecting surface being absent at the location of said reflector.

6. A device as claimed in claim 1, said body being hollow, its internal surface being the elliptical reflecting surface.

7. A device as claimed in claim 1, further comprising a heat blocking layer in the body between the foci of said surface.

8. A device as claimed in claim 7 wherein the heat blocking layer is positioned across the body section of greatest lateral extension.

References Cited

UNITED STATES PATENTS

| Re. 17,037 | 7/1928 | Ballman et al. |
| 1,965,865 | 7/1934 | Thompson _____ 88—24 X |
| 2,254,962 | 9/1941 | Harris et al. _____ 240—41.38 |
| 3,016,785 | 1/1962 | Kapany _____ 240—1 |
| 3,028,483 | 4/1962 | Simmon _____ 240—41.35 |
| 3,099,403 | 7/1963 | Strawick _____ 240—47 |
| 3,107,296 | 10/1963 | Hine _____ 88—24 X |
| 3,127,112 | 3/1964 | McCammon et al. __ 240—41.35 |
| 3,179,898 | 4/1965 | Meltzer _____ 240—41.35 |
| 3,255,342 | 6/1966 | Seitz et al. _____ 240—41.15 |
| 3,285,242 | 11/1966 | Wallace _____ 240—1 XR |

FOREIGN PATENTS

| 229,039 | 2/1925 | Great Britain. |
| 514,201 | 11/1939 | Great Britain. |
| 419,990 | 4/1947 | Italy. |

NORTON ANSHER, *Primary Examiner.*

RICHARD M. SHEER, *Assistant Examiner.*

U.S. Cl. X.R.

88—24; 240—1; 350—96